Figure 1:
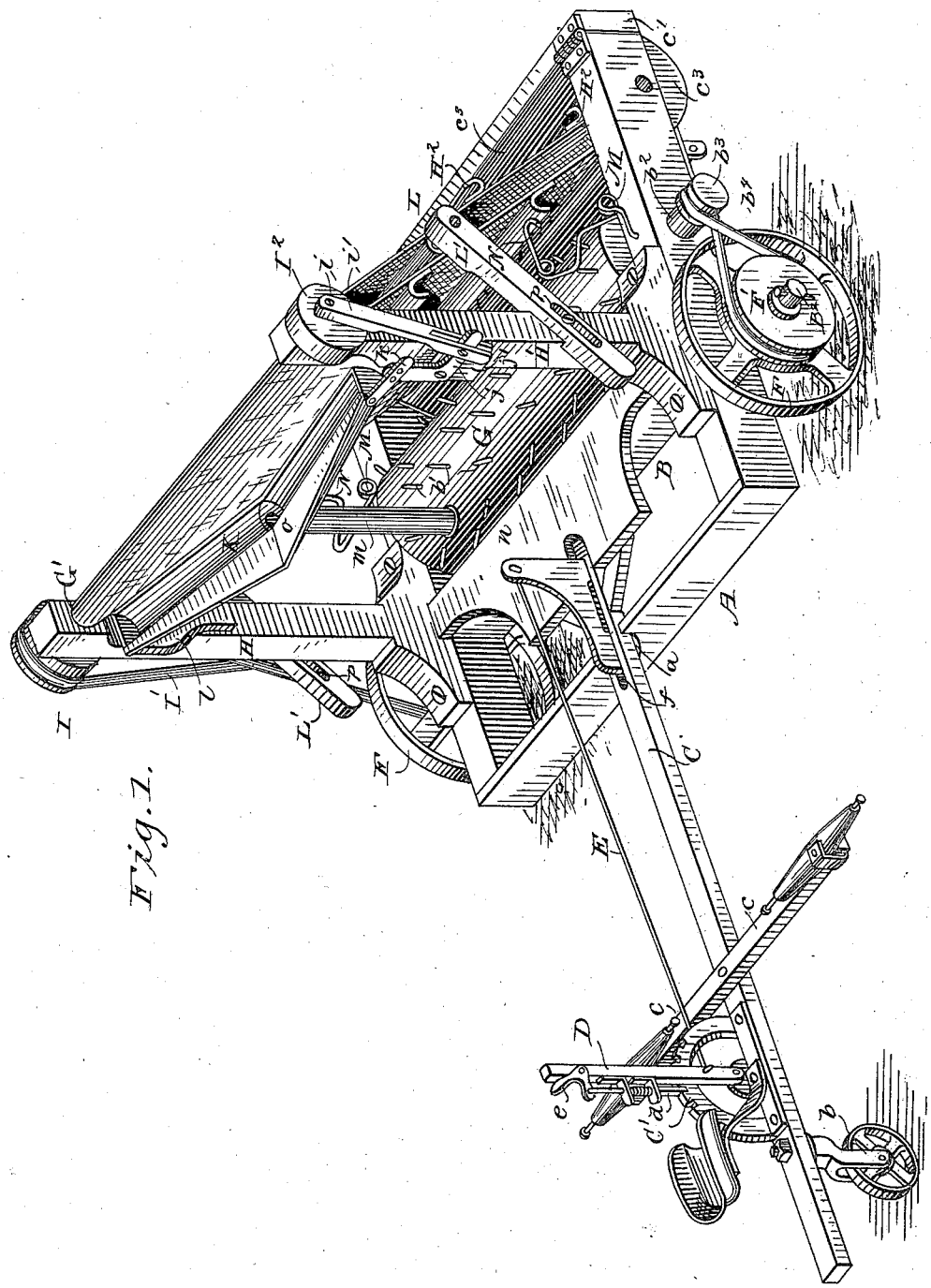

(No Model.) 3 Sheets—Sheet 1.

L. W. LEAVELL, Jr., & R. E. L. LEAVELL.
MACHINE FOR GATHERING GRAIN AND SEED.

No. 363,073. Patented May 17, 1887.

Witnesses
Jos. S. Latimer
Wm. J. Littell

Inventors
Leonidas W. Leavell Jr.
Robert E. Lee Leavell,
By their Attorney
J. R. Littell,

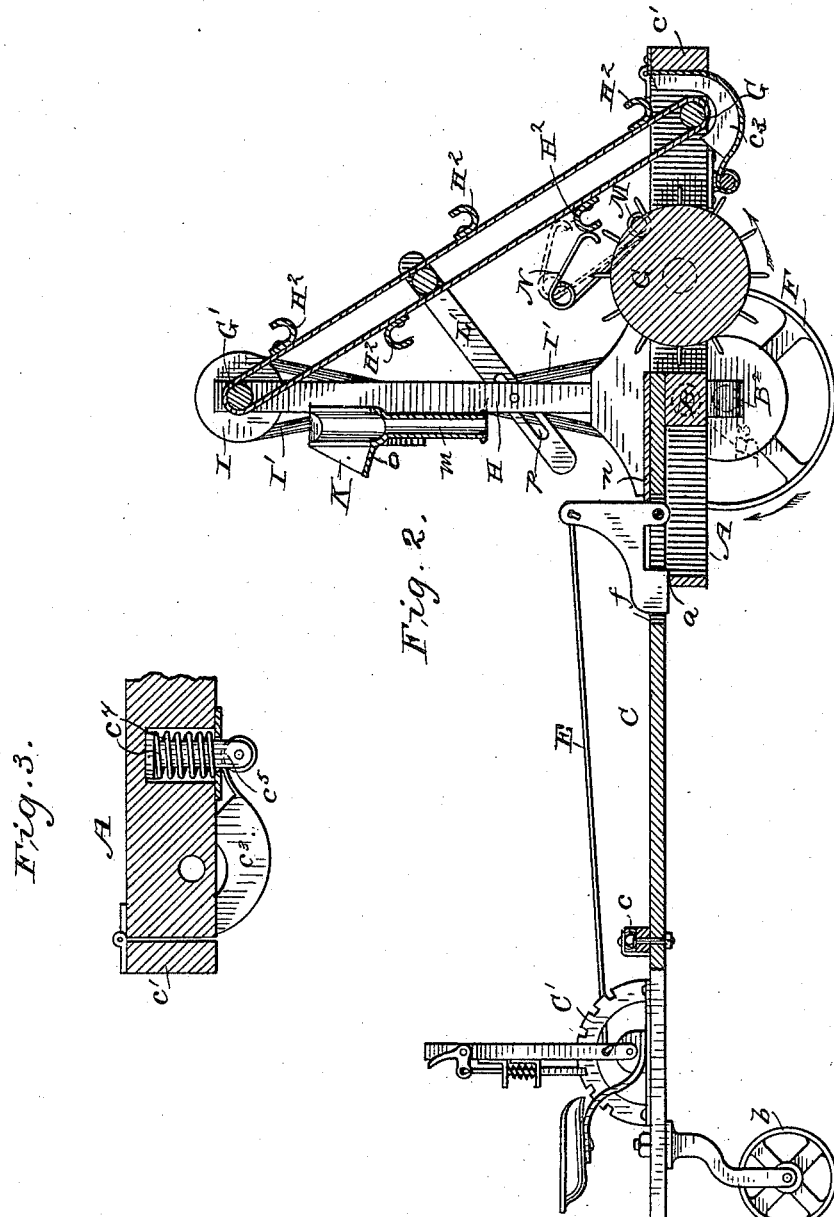

(No Model.) 3 Sheets—Sheet 3.
L. W. LEAVELL, Jr., & R. E. L. LEAVELL.
MACHINE FOR GATHERING GRAIN AND SEED.
No. 363,073. Patented May 17, 1887.
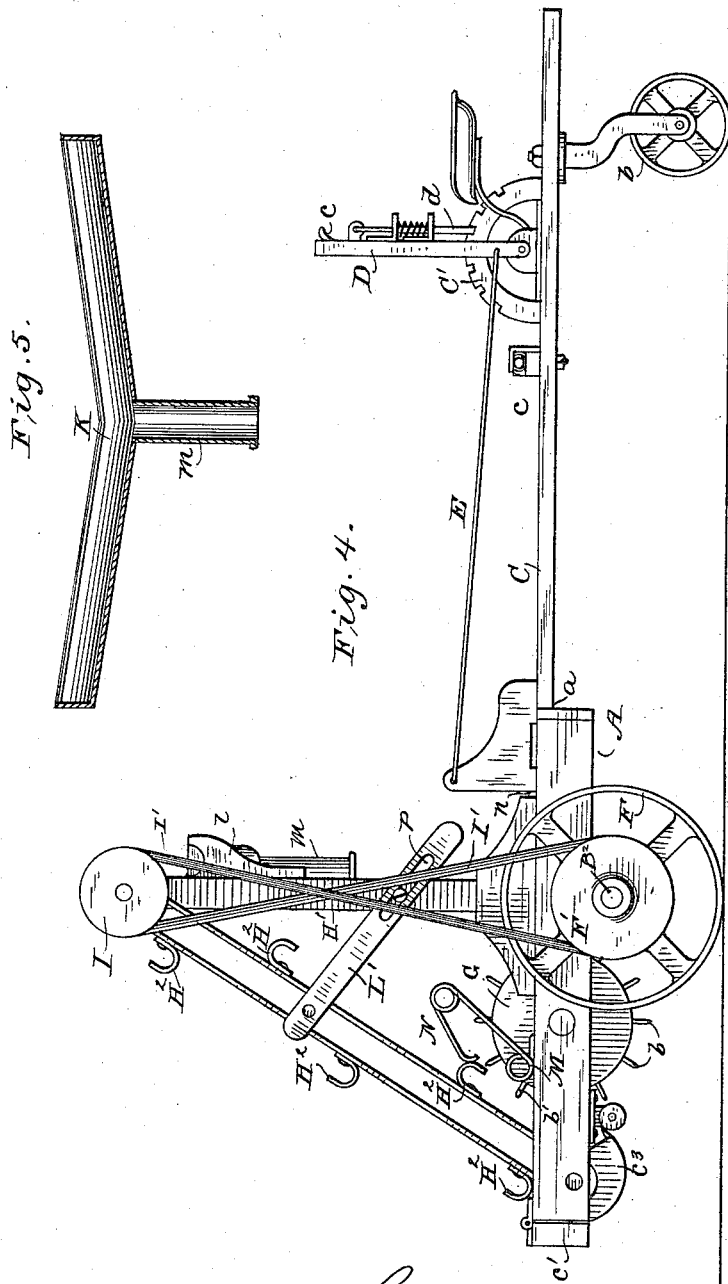

UNITED STATES PATENT OFFICE.

LEONIDAS W. LEAVELL, JR., AND ROBERT E. LEE LEAVELL, OF KEARNEY, MISSOURI.

MACHINE FOR GATHERING GRAIN AND SEED.

SPECIFICATION forming part of Letters Patent No. 363,073, dated May 17, 1887.

Application filed November 17, 1886. Serial No. 219,179. (No model.)

*To all whom it may concern:*

Be it known that we, LEONIDAS W. LEAVELL, Jr., and ROBERT E. LEE LEAVELL, citizens of the United States, residing at Kearney, in the county of Clay and State of Missouri, have invented certain new and useful Improvements in Machines for Gathering Grain and Seed; and we do hereby declare that the following is a full, clear, and exact description of the invention, which will enable others skilled in the art to which it appertains to make and use the same.

Our invention relates to a machine for gathering and bagging grain—such as wheat, oats, barley—and the seed from grass while standing; and the invention consists in the features of construction and combinations of parts, hereinafter fully described, and pointed out in the claims.

In the drawings, Figure 1 is a perspective view of a machine embodying our invention. Fig. 2 is a longitudinal vertical section taken centrally through the machine. Fig. 3 is a detail view of means for supporting the receiving-trough at the front end of the machine. Fig. 4 is a side elevation, and Fig. 5 a detail view, of the delivery-trough.

Corresponding parts in the several figures are denoted by the same letters of reference.

Referring to the drawings, A represents a supporting-frame consisting of side and end beams suitably connected. The side beams of the frame are connected by a cross-beam, B, and secured to said cross-beam is a tongue, C, which fits in a recess, $a$, in the front end beam of the frame A, said draft-pole having at its outer or rear end a swiveled caster-wheel, $b$, adapted for the support of the pole or tongue. The latter is provided just above the caster-wheel with a driver's seat and with a double-tree, $c$, as shown.

C' represents a segment-rack secured to the upper side of the draft-pole within easy reach of the driver, and D represents a pivoted lever carrying a spring-actuated pawl, $d$, connected with a finger-lever, $e$, pivoted to the lever D, and adapted to engage the segment-rack C'.

Pivoted to the draft-pole, near its point of attachment to the beam B, is a bell-crank lever, to the upper end of which is attached a rod, E, which connects it with the pivoted lever D. The lower or free end of the bell crank lever extends through a slot, $f$, in the draft-pole, and is adapted to engage the rear end beam of the supporting-frame. It will thus be seen that by operating the lever D the free arm of the bell-crank lever will be depressed through the agency of the connecting-rod, and the front end of the frame raised or lowered. This action is allowed, since the supporting-frame A is pivotally mounted on the beam B, which connects its side beams, said beam B having spindles (shown in dotted lines at $B^3$, Fig. 2) which extend through bearings or openings (not shown) in the side beams. The beam B is also provided upon its under side at its ends with spindles $B^2$, upon which are mounted the carrying-wheels F, the latter being provided with integral band-pulleys F', for a purpose which will be more fully explained.

Just in front of the beam B is journaled a gathering-cylinder, G, which comprises a drum, having a series of projecting teeth, $b'$. When the machine is to be used for gathering grain, the teeth are some distance apart, while in gathering seed they are arranged quite closely together. One of the journals $b^2$ of the gathering-cylinder is extended beyond the supporting-frame, and is provided with a band-pulley, $b^3$, connected with the pulley on the carrying-wheel adjacent thereto by a crossed belt, $b^4$, so that the movement of the gathering-cylinder will be the reverse to that of the carrying-wheels.

The front end beam, $c'$, of the supporting-frame is hinged to the side beams, and secured to said end beam is a receiving-trough, $c^3$, which extends forward adjacent to the gathering-cylinder, so that it will receive the grain as it is harvested by the gathering-cylinder. The rear or inner edge of the receiving-trough is flexibly supported by springs $c^4$, secured in recesses in the side beams and connected with the trough by plates $c^5$, as clearly shown in Fig. 3.

Journaled in the side beams of the supporting-frame and located in the receiving-trough is a roller, G, and projecting upwardly from the side beams of the frame just in front of the gathering cylinder are two uprights, H H', between which, at the upper end thereof, is journaled a roller, G'. These rollers are connected by an elevator consisting of an endless belt having a series of cups, H², secured thereto, and extending entirely across the face of the belt. It will thus be seen that when the belt is in motion the cups will scoop grain or seed from the receiving-trough and carry it upwardly and discharge it as the cups pass over the upper roller.

The roller G' is extended beyond the uprights at each end, and upon one end of said roller is mounted a pulley, I, connected with the pulley on the carrying-wheel adjacent thereto by means of a crossed belt, L', whereby the belt will be driven. It will be seen that by supporting the free end of the receiving-trough with springs the cups on the belt can easily pass the same and yet fit closely. On the other end of the roller G' is mounted a crank-wheel, I², carrying a wrist, $i$, on which is journaled an arm or rod, $i'$, slotted at its lower end, and in the slotted lower end of said arm is pivoted one end of a bell-crank lever, $j$, said lever being pivoted to a block, $j'$, secured to the upright H'. The bell-crank lever is pivotally connected, by means of a link, $k$, with a trough, K, which delivers the grain or seed to the bags. This trough is loosely mounted, at the opposite end to that at which the link $k$ is connected with it, in a block, $l$, so that it will be reciprocated by means of the bell-crank lever and arm and link connections as the belt is in motion. The trough converges toward its center from each end, and is provided at such point with a spout, $m$, located over a platform, $n$, on which a bag or other receptacle to receive the grain is located. Said trough is also provided at its outer edge with a guard or flange, $o$, to prevent the grain from spilling from the trough as it is delivered thereto from the cups on the endless belt.

L represents a support to prevent the endless belt from sagging as it elevates the grain. This support consists of the slotted arms L', secured to the outer faces of the uprights H H' by means of set-screws $p$, and carrying a roller adapted to bear against the belt, as shown. By making the arms adjustable on their supports it will be observed that the roller may be adjusted to or from the belt.

M represents springs secured to the side beams of the supporting-frame and formed with projecting arms N, adapted to engage the cups when the machine is backed, as shown in dotted lines, Fig. 2, to prevent the rotation of the belt, but at the same time allowing said cups to easily pass them when the machine is moved forward.

The operation of our improvement will be obvious from the above description, taken in connection with the accompanying drawings.

The machine is simple in its construction, strong and durable, and thoroughly effective in operation.

Having fully described our invention, what we claim as new, and desire to secure by Letters Patent, is—

1. In a machine for gathering grain, the combination of a supporting-frame, a trough secured to the front beam of the frame and depending therefrom, and a gathering-cylinder journaled upon the frame in rear of the trough and having an upward rotary movement with relation to the latter, whereby the grain is carried over the rear edge of the trough and deposited into the same by the rotation of the cylinder, substantially as set forth.

2. In a machine for gathering grain, the combination of a supporting-frame comprising a hinged front beam, a trough having its front edge secured to said beam and depending therefrom, springs connected with the frame and supporting the rear edge of the trough, and a toothed gathering-cylinder journaled in rear of the trough and adapted to carry the grain over the spring-supported rear edge of the same, substantially as set forth.

3. The combination, in a machine for gathering grain, with the trough having one edge yieldingly supported by springs, of a gathering-cylinder for carrying the grain over the yieldingly-supported side of the trough and depositing it in the same, substantially as set forth.

4. The combination of a supporting-frame, a trough secured at the front end of the same, a gathering-cylinder journaled in rear of the trough and having an upward rotary movement, and an elevator extending from within the trough up over the cylinder, substantially as and for the purpose set forth.

5. The combination of a supporting frame, a receiving-trough secured at the front end of the same, a gathering-cylinder journaled in rear of the trough and having an upward rotary movement, uprights upon the frame, an elevator extending from within the trough up over the cylinder to the top of said uprights, and a reciprocating delivery-trough mounted near the top end of the elevator, substantially as and for the purpose set forth.

6. The combination of a supporting-frame, a receiving-trough secured at the front end of the same, a gathering-cylinder journaled in rear of the trough, uprights upon the frame, an elevator extending from the trough to the top of the uprights, and slotted arms secured to the uprights by means of set-screws and carrying a belt-tightening roller bearing against the inner part of the belt of the elevator, substantially as set forth.

7. The combination, with the elevator-belt having a series of transverse cups or pockets, of springs secured to the frame and formed with projecting arms N, adapted to engage the cups, when the machine is backed, to prevent rotation of the belt, substantially as and for the purpose set forth.

In testimony whereof we affix our signatures in presence of two witnesses.

LEONIDAS W. LEAVELL, JR.
ROBERT E. LEE LEAVELL.

Witnesses:
PRESLEY D. ANDERSON,
ABRAM L. NORFLEET.